US012800728B2

(12) United States Patent
McCord

(10) Patent No.: US 12,800,728 B2
(45) Date of Patent: Nov. 17, 2026

(54) SCANNING LIDAR SYSTEMS WITH SCANNING FIBER

(71) Applicant: Cepton Technologies, Inc., San Jose, CA (US)

(72) Inventor: Mark A. McCord, Los Gatos, CA (US)

(73) Assignee: Cepton Technologies, Inc., San Jose, CA (US)

(*) Notice: Subject to any disclaimer, the term of this patent is extended or adjusted under 35 U.S.C. 154(b) by 1514 days.

(21) Appl. No.: 17/385,669

(22) Filed: Jul. 26, 2021

(65) Prior Publication Data

US 2021/0382151 A1 Dec. 9, 2021

Related U.S. Application Data

(63) Continuation-in-part of application No. 16/504,989, filed on Jul. 8, 2019, now Pat. No. 11,822,020.
(Continued)

(51) Int. Cl.
*G01S 7/481* (2006.01)
*G01S 7/484* (2006.01)
*G01S 7/4861* (2020.01)

(52) U.S. Cl.
CPC .......... *G01S 7/4818* (2013.01); *G01S 7/4817* (2013.01); *G01S 7/484* (2013.01); *G01S 7/4861* (2013.01)

(58) Field of Classification Search
None
See application file for complete search history.

(56) References Cited

U.S. PATENT DOCUMENTS

| | | | |
|---|---|---|---|
| 5,216,236 | A | 6/1993 | Blais |
| 5,422,469 | A | 6/1995 | Bard et al. |
| 5,486,944 | A | 1/1996 | Bard et al. |
| 2007/0181810 | A1 | 8/2007 | Tan et al. |
| 2008/0278785 | A1 | 11/2008 | Klose et al. |
| 2012/0227263 | A1 | 9/2012 | Leclair et al. |

(Continued)

FOREIGN PATENT DOCUMENTS

| | | | |
|---|---|---|---|
| JP | 2002-181533 | A | 6/2002 |
| JP | 2003-042723 | A | 2/2003 |

(Continued)

OTHER PUBLICATIONS

Notice of Reasons for Refusal dated Mar. 24, 2023 in related Japanese Patent Application No. 2021-500376, filed Jul. 9, 2019 (nine pages).

(Continued)

*Primary Examiner* — Isam A Alsomiri
*Assistant Examiner* — Sanjida Naser
(74) *Attorney, Agent, or Firm* — Kilpatrick Townsend & Stockton LLP

(57) ABSTRACT

A scanning LiDAR system includes a lens, one or more laser sources, one or more photodetectors, and one or more optical fibers. Each respective optical fiber has a first end attached to a platform and a second end optically coupled to a respective laser source and a respective photodetector, and is configured to receive and propagate a light beam emitted by the respective laser source from the second end to the first end, and receive and propagate a return light beam from the first end to second end, so as to be received by the respective photodetector. The scanning LiDAR system further includes a flexure assembly flexibly coupling the platform to a base frame, and a driving mechanism configured to cause the flexure assembly to be flexed so as to scan the platform laterally in a plane substantially perpendicular to an optical axis of the scanning LiDAR system.

18 Claims, 14 Drawing Sheets

Related U.S. Application Data

(60) Provisional application No. 62/696,247, filed on Jul. 10, 2018.

(56) References Cited

U.S. PATENT DOCUMENTS

| | | | |
|---|---|---|---|
| 2013/0266326 | A1 | 10/2013 | Joseph et al. |
| 2016/0161600 | A1 | 6/2016 | Eldada et al. |
| 2017/0285148 | A1 | 10/2017 | Hipp |
| 2017/0307758 | A1 | 10/2017 | Pei et al. |
| 2018/0062345 | A1 | 3/2018 | Bills et al. |
| 2018/0180720 | A1 | 6/2018 | Pei et al. |
| 2018/0180722 | A1 | 6/2018 | Pei et al. |
| 2019/0120940 | A1 | 4/2019 | Pei et al. |
| 2019/0212547 | A1* | 7/2019 | Petit ...................... G01S 7/4818 |
| 2020/0018835 | A1 | 1/2020 | Pei et al. |

FOREIGN PATENT DOCUMENTS

| | | | |
|---|---|---|---|
| JP | 2003-177348 | A | 6/2003 |
| JP | 2004-085225 | A | 3/2004 |
| JP | 2009-288099 | A | 12/2009 |
| JP | 2010-203907 | A | 9/2010 |
| WO | 2020/101760 | A2 | 5/2020 |

OTHER PUBLICATIONS

Supplementary European Search Report dated Oct. 26, 2021 in related European Patent Application No. 19884206.4, filed Jul. 9, 2019 (15 pages).

International Search Report and Written Opinion of the International Searching Authority mailed Apr. 30, 2020 of corresponding related International Application No. PCT/US 19/40963, filed Jul. 9, 2019 (14 pages).

International Preliminary Report on Patentability dated Jan. 12, 2021 of corresponding related International Application No. PCT/US 19/40963, filed Jul. 9, 2019 (seven pages).

Partial Supplementary European Search Report dated Jul. 20, 2021 in related European Patent Application No. 19 884 206.4 (14 pages.).

Non-Final Office Action dated Mar. 7, 2023 in related U.S. Appl. No. 16/504,989, filed Jul. 8, 2019 (21 pages).

* cited by examiner

SCANNING LIDAR SYSTEMS WITH SCANNING FIBER

CROSS-REFERENCES TO RELATED APPLICATIONS

This application is continuation-in-part of U.S. patent application Ser. No. 16/504,989, filed on Jul. 8, 2019, which claims the benefit of U.S. Provisional Patent Application No. 62/696,247, filed on Jul. 10, 2018, the contents of which are hereby incorporated by reference in their entireties.

BACKGROUND OF THE INVENTION

Three-dimensional sensors can be applied in autonomous vehicles, drones, robotics, security applications, and the like. LiDAR sensors may achieve high angular resolutions appropriate for such applications. Existing techniques for scanning laser beams of a LiDAR sensor across a field of view (FOV) include rotating an entire LiDAR sensor assembly, or using a scanning mirror to deflect a laser beam to various directions. Improved scanning LiDAR systems are needed.

SUMMARY OF THE INVENTION

According to some embodiments, a scanning LiDAR system includes a base frame, a lens frame fixedly attached to the base frame, a lens attached to the lens frame, and an optoelectronic assembly fixedly attached to the base frame. The optoelectronic assembly includes one or more laser sources and one or more photodetectors. The scanning LiDAR system further includes a platform, and one or more optical fibers. Each respective optical fiber has a first end attached to the platform, and a second end optically coupled to a respective laser source and a respective photodetector. The platform is positioned with respect to the lens such that the first end of each respective optical fiber is positioned substantially at the focal plane of the lens. Each respective optical fiber is configured to: receive and propagate a light beam emitted by the respective laser source from the second end to the first end; and receive and propagate a return light beam from the first end to second end, so as to be received by the respective photodetector. The scanning LiDAR system further includes a flexure assembly flexibly coupling the platform to the lens frame or the base frame, and a driving mechanism coupled to the flexure assembly and configured to cause the flexure assembly to be flexed so as to scan the platform laterally in a plane substantially perpendicular to an optical axis of the scanning LiDAR system, thereby scanning the first end of each optical fiber in the plane relative to the lens.

According to some embodiments, a method of three-dimensional imaging using a scanning LiDAR system is provided. The scanning LiDAR system includes an optoelectronic assembly and a lens. The optoelectronic assembly includes at least a first laser source and a first photodetector. The method includes emitting, using the first laser source, a plurality of laser pulses, and coupling each of the plurality of laser pulses into an optical fiber through a first end of the optical fiber. A second end of the optical fiber is attached to a platform that is positioned with respect to the lens such that the second end of the optical fiber is positioned substantially at a focal plane of the lens. The method further includes translating the second end of the optical fiber in the focal plane of the lens by translating the platform, so that the lens projects the plurality of laser pulses at a plurality of angles in a field of view (FOV) in front of the scanning LiDAR system, and receiving and focusing, using the lens, a plurality of return laser pulses reflected off one or more objects onto the second end of the optical fiber. A portion of each of the plurality of return laser pulses is coupled into the optical fiber through the first end and propagated therethrough to the first end. The method further includes detecting, using the first photodetector optically coupled to the first end of the optical fiber, the plurality of return laser pulses, determining, using a processor, a time of flight for each return laser pulse of the plurality of return laser pulses, and constructing a three-dimensional image of the one or more objects based on the times of flight of the plurality of return laser pulses.

DETAILED DESCRIPTION OF THE SPECIFIC EMBODIMENTS

The present invention relates generally to scanning LiDAR systems for three-dimensional imaging. Merely by way of examples, embodiments of the present invention provide apparatuses and methods for a scanning LiDAR system in which a lens assembly is moved while an optoelectronic assembly is fixed. In some other embodiments, both the lens assembly and the optoelectronic assembly are fixed, and the ends of an array of optical fibers coupled to the optoelectronic assembly are scanned relative to the lens assembly.

Figure 1:
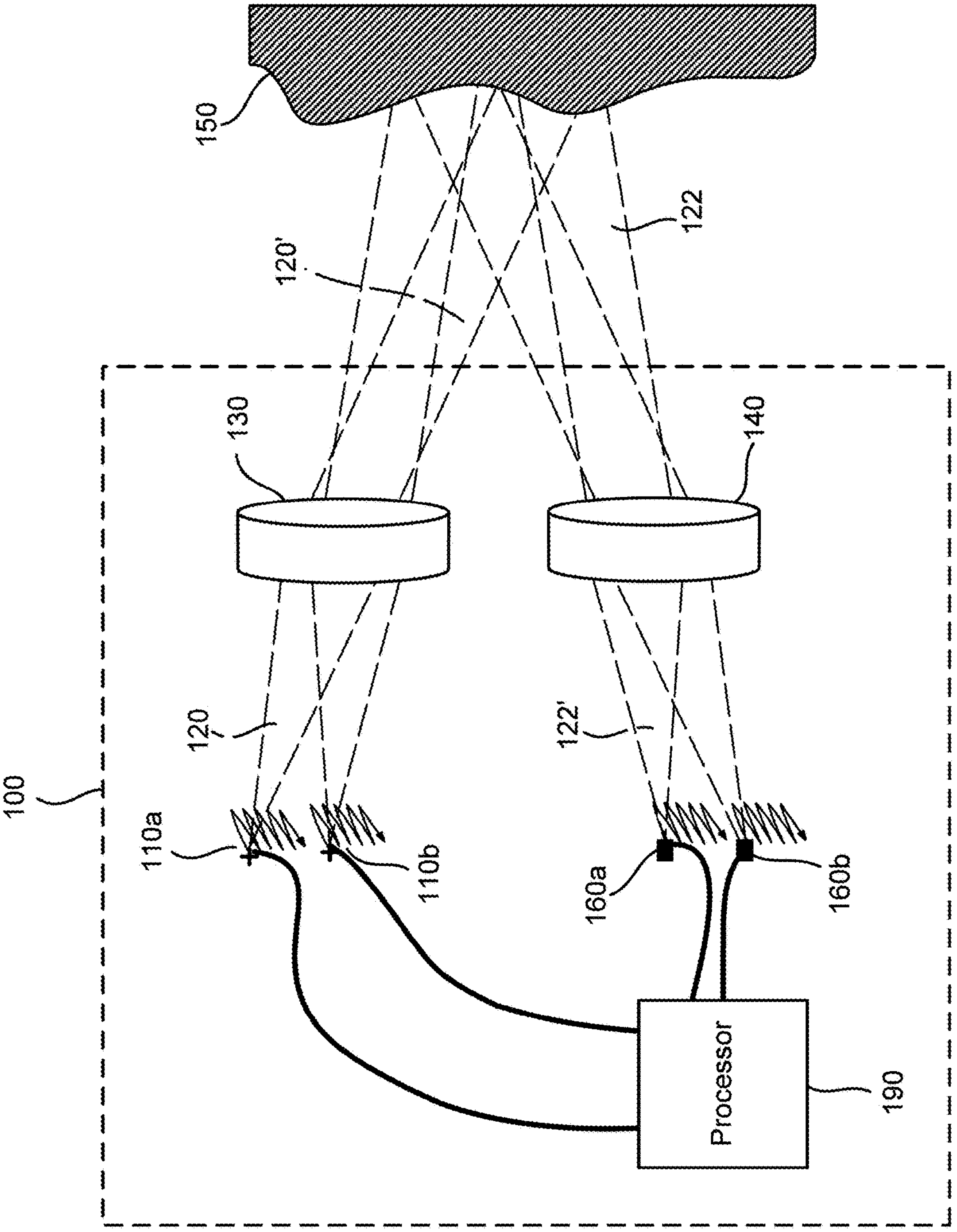
FIG. 1 illustrates schematically a LiDAR sensor for three-dimensional imaging according to some embodiments.

FIG. 1 illustrates schematically a LiDAR sensor 100 for three-dimensional imaging according to some embodiments.

The LiDAR sensor 100 includes an emitting lens 130 and a receiving lens 140. The LiDAR sensor 100 includes a laser source 110*a* disposed substantially in a back focal plane of the emitting lens 130. The laser source 110*a* is operative to emit a laser pulse 120 from a respective emission location in the back focal plane of the emitting lens 130. The emitting lens 130 is configured to collimate and direct the laser pulse 120 toward an object 150 located in front of the LiDAR sensor 100. For a given emission location of the laser source 110*a*, the collimated laser pulse 120' is directed at a corresponding angle toward the object 150.

A portion 122 of the collimated laser pulse 120' is reflected off of the object 150 toward the receiving lens 140. The receiving lens 140 is configured to focus the portion 122' of the laser pulse reflected off of the object 150 onto a corresponding detection location in the focal plane of the receiving lens 140. The LiDAR sensor 100 further includes a photodetector 160*a* disposed substantially at the focal plane of the receiving lens 140. The photodetector 160*a* is configured to receive and detect the portion 122' of the laser pulse 120 reflected off of the object at the corresponding detection location. The corresponding detection location of the photodetector 160*a* is optically conjugate with the respective emission location of the laser source 110*a*.

The laser pulse 120 may be of a short duration, for example, 100 ns pulse width. The LiDAR sensor 100 further includes a processor 190 coupled to the laser source 110*a* and the photodetector 160*a*. The processor 190 is configured to determine a time of flight (TOF) of the laser pulse 120 from emission to detection. Since the laser pulse 120 travels at the speed of light, a distance between the LiDAR sensor 100 and the object 150 may be determined based on the determined time of flight.

One way of scanning the laser beam 120' across a FOV is to move the laser source 110*a* laterally relative to the emission lens 130 in the back focal plane of the emission lens 130. For example, the laser source 110*a* may be raster scanned to a plurality of emission locations in the back focal plane of the emitting lens 130 as illustrated in FIG. 1. The laser source 110*a* may emit a plurality of laser pulses at the plurality of emission locations. Each laser pulse emitted at a respective emission location is collimated by the emitting lens 130 and directed at a respective angle toward the object 150, and impinges at a corresponding point on the surface of the object 150. Thus, as the laser source 110*a* is raster scanned within a certain area in the back focal plane of the emitting lens 130, a corresponding object area on the object 150 is scanned. The photodetector 160*a* may be raster scanned to be positioned at a plurality of corresponding detection locations in the focal plane of the receiving lens 140, as illustrated in FIG. 1. The scanning of the photodetector 160*a* is typically performed synchronously with the scanning of the laser source 110*a*, so that the photodetector 160*a* and the laser source 110*a* are always optically conjugate with each other at any given time.

By determining the time of flight for each laser pulse emitted at a respective emission location, the distance from the LiDAR sensor 100 to each corresponding point on the surface of the object 150 may be determined. In some embodiments, the processor 190 is coupled with a position encoder that detects the position of the laser source 110*a* at each emission location. Based on the emission location, the angle of the collimated laser pulse 120' may be determined. The X-Y coordinate of the corresponding point on the surface of the object 150 may be determined based on the angle and the distance to the LiDAR sensor 100. Thus, a three-dimensional image of the object 150 may be constructed based on the measured distances from the LiDAR sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return laser pulse 122' is measured and used to adjust the power of subsequent laser pulses from the same emission point, in order to prevent saturation of the detector, improve eye-safety, or reduce overall power consumption. The power of the laser pulse may be varied by varying the duration of the laser pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the intensity may also be used to add another dimension to the image. For example, the image may contain X, Y, and Z coordinates, as well as reflectivity (or brightness).

The angular field of view (AFOV) of the LiDAR sensor 100 may be estimated based on the scanning range of the laser source 110*a* and the focal length of the emitting lens 130 as, $$AFOV = 2\tan^{-1}\left(\frac{h}{2f}\right),$$

where h is scan range of the laser source 110*a* along certain direction, and f is the focal length of the emitting lens 130. For a given scan range h, shorter focal lengths would produce wider AFOVs. For a given focal length f, larger scan ranges would produce wider AFOVs. In some embodiments, the LiDAR sensor 100 may include multiple laser sources disposed as an array at the back focal plane of the emitting lens 130, so that a larger total AFOV may be achieved while keeping the scan range of each individual laser source relatively small. Accordingly, the LiDAR sensor 100 may include multiple photodetectors disposed as an array at the focal plane of the receiving lens 140, each photodetector being conjugate with a respective laser source. For example, the LiDAR sensor 100 may include a second laser source 110*b* and a second photodetector 160*b*, as illustrated in FIG. 1. In other embodiments, the LiDAR sensor 100 may include four laser sources and four photodetectors, or eight laser sources and eight photodetectors. In one embodiment, the LiDAR sensor 100 may include 8 laser sources arranged as a 4×2 array and 8 photodetectors arranged as a 4×2 array, so that the LiDAR sensor 100 may have a wider AFOV in the horizontal direction than its AFOV in the vertical direction. According to various embodiments, the total AFOV of the LiDAR sensor 100 may range from about 5 degrees to about 15 degrees, or from about 15 degrees to about 45 degrees, or from about 45 degrees to about 90 degrees, depending on the focal length of the emitting lens, the scan range of each laser source, and the number of laser sources.

The laser source 110*a* may be configured to emit laser pulses in the ultraviolet, visible, or near infrared wavelength ranges. The energy of each laser pulse may be in the order of microjoules, which is normally considered to be eye-safe for repetition rates in the KHz range. For laser sources operating in wavelengths greater than about 1500 nm, the energy levels could be higher as the eye does not focus at those wavelengths. The photodetector 160*a* may comprise a silicon avalanche photodiode, a photomultiplier, a PIN diode, or other semiconductor sensors.

The angular resolution of the LiDAR sensor 100 can be effectively diffraction limited, which may be estimated as, $$\theta = 1.22\ \lambda/D,$$

where λ is the wavelength of the laser pulse, and D is the diameter of the lens aperture. The angular resolution may also depend on the size of the emission area of the laser source 110*a* and aberrations of the lenses 130 and 140. According to various embodiments, the angular resolution of the LiDAR sensor 100 may range from about 1 mrad to about 20 mrad (about 0.05-1.0 degrees), depending on the type of lenses.

I. Lidar Systems with Moving Lens Assembly

As discussed above, for the LiDAR system illustrated in FIG. 1, one method of scanning the collimated laser beam 120' across a FOV in the scene is to keep the emission lens 130 and the receiving lens 140 fixed, and move the laser source 110*a* laterally in the focal plane of the emission lens 130, either in one dimension or two dimensions. In the case of two-dimensional scanning, the scanning pattern can be either a raster scan pattern (as illustrated in FIG. 1) or a Lissajous pattern. A corresponding photodetector 160*a* may be moved synchronously with the motion of the laser source 110*a* so as to maintain an optical conjugate relationship, as discussed above.

The laser source 110*a* and the photodetector 160*a* are usually connected to power sources and control electronics via electrical cables. Since the power sources and the control electronics are normally stationary, moving the laser source 110*a* and the photodetector 160*a* may cause strains on the electrical cables, and can potentially affect the robustness of the operation of the LiDAR system. According to some embodiments, the laser source 110*a* and the photodetector 160*a* remain fixed, and the scanning of the laser beam 120' across the FOV is achieved by moving the emission lens 130 laterally in a plane substantially perpendicular to its optical axis (e.g., in the plane perpendicular to the page), either in one dimension or two dimensions. Accordingly, the receiving lens 140 is moved synchronously with the motion of the emission lens 130, so that a return laser beam 122' is focused onto the photodetector 160*a*. This scanning method has the advantage that no electrical connection is required between moving parts and stationary parts. It may also make it easier to adjust the alignment of the laser source 110*a* and the photodetector 160*a* during operation, since they are not moving.

Figure 2:
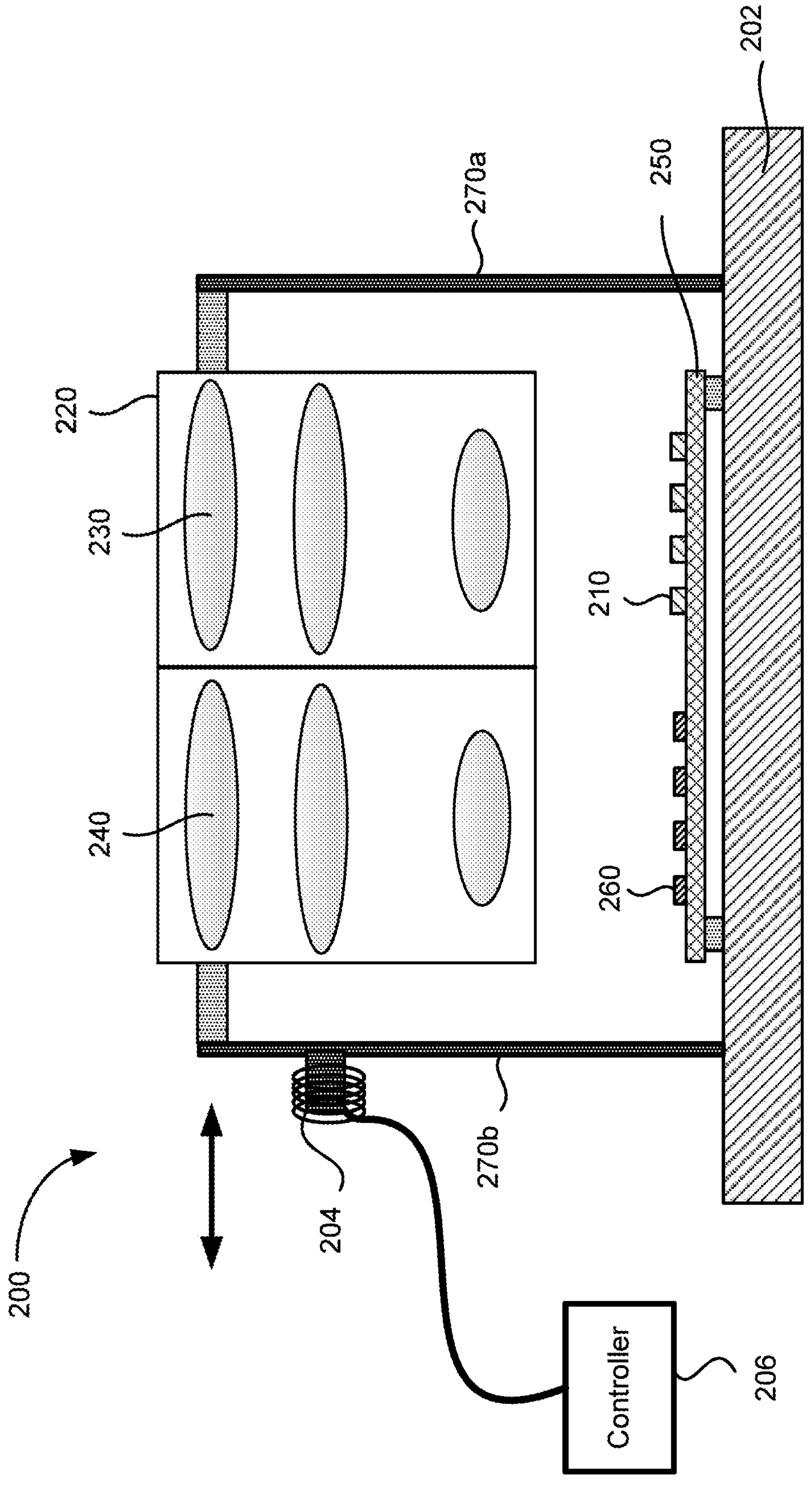
FIG. 2 illustrates schematically a scanning LiDAR system in which a lens assembly is scanned according to some embodiments.

FIG. 2 illustrates schematically a scanning LiDAR system 200 according to some embodiments. The LiDAR system 200 may include one or more laser sources 210, and one or more photodetectors 260 (e.g., four laser sources 210 and four photodetectors 260 as shown in FIG. 2). The laser sources 210 and the photodetectors 260 may be mounted on an optoelectronic board 250, which may be fixedly attached to a base frame 202. The optoelectronic board 250 with the laser sources 210 and the photodetectors 260 mounted thereon may be referred to herein as an optoelectronic assembly. The optoelectronic board 250 may include electronic circuitry for controlling the operations of the laser sources 210 and the photodetectors 260. Electrical cables may connect the electronic circuitry to power supplies and computer processors, which may be attached to the base frame 202 or located elsewhere. Note that the laser sources 210 and the photodetectors 260 may be arranged as either one-dimensional or two-dimensional arrays (e.g., in the case of a two-dimensional array, there may be one or more rows offset from each other in the direction perpendicular to the paper.)

The LiDAR system 200 may further include an emission lens 230 and a receiving lens 240. Each of the emission lens 230 and the receiving lens 240 may be a compound lens that includes multiple lens elements. The emission lens 230 and the receiving lens 240 may be mounted in a lens mount 220. The lens mount 220 with the emission lens 230 and the receiving lens 240 attached thereto may be referred to herein as a lens assembly.

The lens assembly may be flexibly attached to the base frame 202 via a pair of flexures 270*a* and 270*b* as illustrated in FIG. 2. The lens assembly 220 is positioned above the optoelectronic board 250 such that the laser sources 210 are positioned substantially at the focal plane of the emission lens 230, and the photodetectors 260 are positioned substantially at the focal plane of the receiving lens 240. In addition, the laser sources 210 and the photodetectors 260 are positioned on the optoelectronic board 250 such that the position of each respective laser source 210 and the position of a corresponding photodetector 260 are optically conjugate with respect to each other, as described above with reference to FIG. 1.

As illustrated in FIG. 2, one end of each of the pair of flexures 270*a* and 270*b* is attached to the base frame 202, while the other end is attached to the lens assembly 220. The pair of flexures 270*a* and 270*b* may be coupled to an actuator 204 (also referred herein as a driving mechanism), such as a voice coil motor. The actuator 204 may be controlled by a controller 206 to cause the pair of flexures 270*a* and 270*b* to be deflected left or right as in a parallelogram, thus causing the lens assembly 220 to move left or right as indicated by the double-sided arrow in FIG. 2. The lateral movement of the emission lens 230 may cause the laser beams emitted by the laser sources 210 to be scanned across a FOV in front of the LiDAR system 200. As the entire lens assembly 220, including the emission lens 230 and the receiving lens 240, is moved as a single unit, the optical conjugate relationship between the laser sources 210 and the photodetectors 260 are maintained as the lens assembly 220 is scanned.

Because the lens assembly 220 may not require any electrical connections for power, moving the lens assembly 220 may not cause potential problems with electrical connections, as compared to the case in which the optoelectronic board 250 is being moved. Therefore, the LiDAR system 200 may afford more robust operations. It may also be easier to adjust the alignment of the laser sources 210 and photodetectors 260 during operation, since they are not moving.

Although FIG. 2 shows two rod-shaped flexures 270*a* and 270*b* for moving the lens assembly 220, other flexure mechanisms or stages may be used. For example, springs, air bearings, and the like, may be used. In some embodiments, the drive mechanism 204 may include a voice coil motor (VCM), a piezo-electric actuator, and the like. At high scan frequencies, the pair of flexures 270*a* and 270 *b* and drive mechanism 204 may be operated at or near its resonance frequency in order to minimize power requirements.

Figure 3:
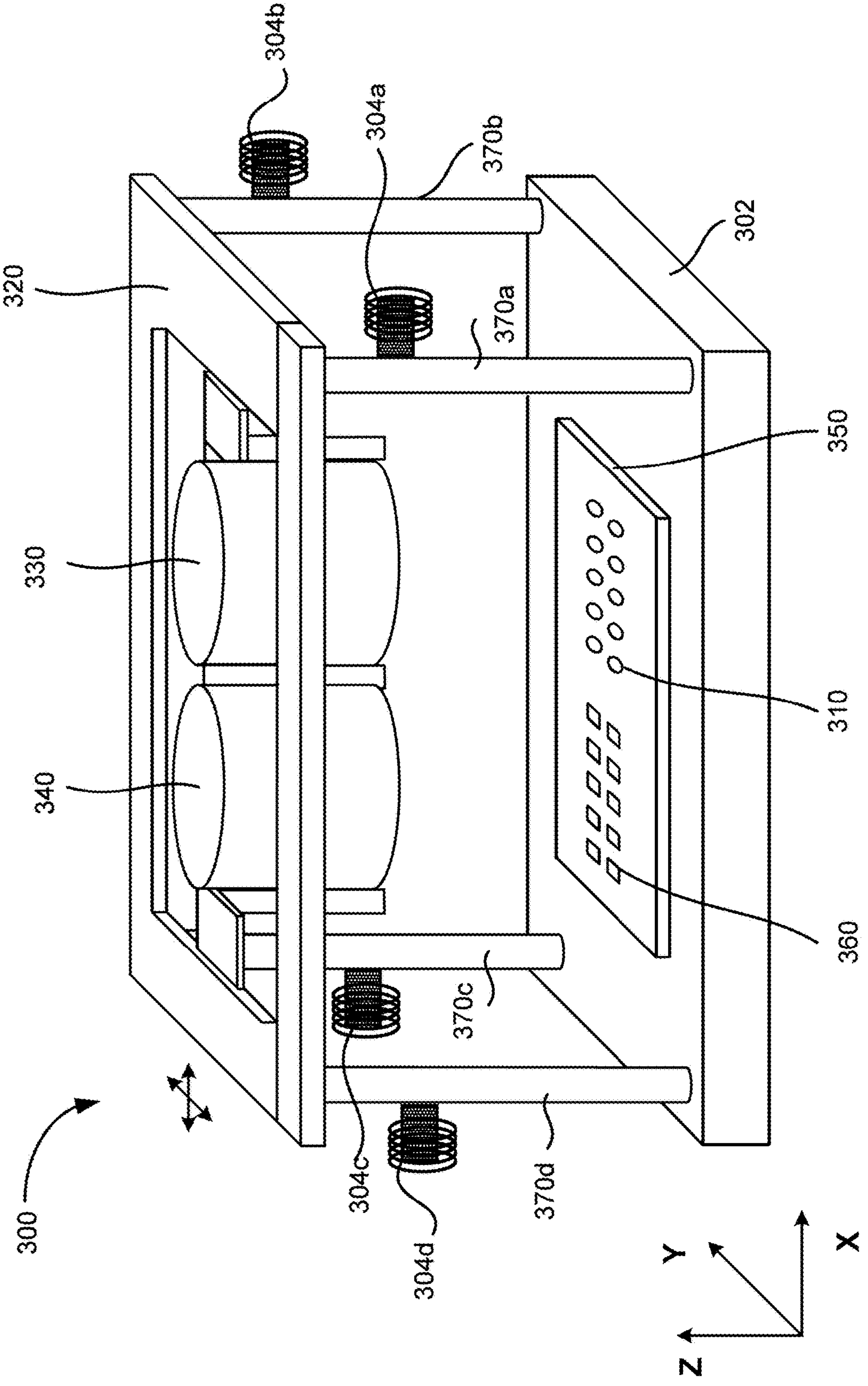
FIG. 3 illustrates schematically a scanning LiDAR system in which a lens assembly may be scanned in two-dimensions according to some embodiments.

FIG. 3 illustrates schematically a scanning LiDAR system 300 in which a lens assembly 320 may be scanned in two-dimensions according to some embodiments. Similar to the LiDAR system 200 illustrated in FIG. 2, the LiDAR system 300 may include one or more laser sources 310, and one or more photodetectors 360 (e.g., ten laser sources 210 arranged as a 2×5 array and ten photodetectors 260 arranged as a 2×5 array as shown in FIG. 3), which may be mounted on an optoelectronic board 350. In FIG. 3, the laser sources 310 and the photodetectors 360 are illustrated as arranged in two-dimensional arrays. In some embodiments, the laser sources 310 and the photodetectors 360 may be arranged in one-dimensional arrays. The optoelectronic board 350 may be fixedly attached to a base frame 302. The optoelectronic board 350 may include electronic circuitry (not shown) for controlling the operations of the laser sources 310 and the photodetectors 360.

The LiDAR system 300 may further include an emission lens 330 and a receiving lens 340. (Note that each of the emission lens 330 and the receiving lens 340 may be a compound lens that includes multiple lens elements.) The emission lens 330 and the receiving lens 340 may be mounted in a lens frame 320. The lens frame 320 with the emission lens 330 and the receiving lens 340 attached thereto may be referred to herein as a lens assembly.

The lens assembly 320 may be flexibly attached to the base frame 302 via four flexures 370*a*-370*d*. A first end of each flexure 370*a*, 370*b*, 370*c*, or 370*d* is attached to a respective corner of the lens frame 320. A second end of each flexure 370*a*, 370*b*, 370*c*, or 370*d* opposite to the first end is attached to the base frame 302, as illustrated in FIG. 3. The lens assembly 320 is positioned above the optoelectronic board 350 such that the laser sources 310 are positioned substantially at the focal plane of the emission lens 330, and the photodetectors 360 are positioned substantially at the focal plane of the receiving lens 340.

In some embodiments, the flexures 370*a*-370*d* may be made of spring steel such as music wires, so that the flexures 370*a*-370*d* can be deflected in two dimensions. One or more actuators 304*a*-304*d* (e.g., voice coil motors or other types of actuators) may be coupled to the flexures 370*a*-370*d*, and can cause the first end of each flexure to be deflected, thus causing the lens assembly 320 to move in two dimensions in a plane substantially perpendicular to the optical axis (e.g., along the Z-direction) of the emission lens 330 or the receiving lens 340, as indicated by the two orthogonal double-sided arrows in FIG. 3. For the convenience of description, the scans in the two orthogonal directions may be referred herein as horizontal scan and vertical scan, respectively. Similar to the LiDAR system 200 illustrated in FIG. 2, the lateral movement of the emission lens 330 may cause the laser beams emitted by the laser sources 310 to be scanned across a FOV in front of the LiDAR system 300.

In some embodiments, the two-dimensional scanning of the lens assembly may be performed in a raster scan pattern. For example, the lens assembly may be scanned at a higher frequency (e.g., on the order of a hundred to a few hundred Hz) in the horizontal direction (e.g., the X-direction), and at a lower frequency (e.g., on the order of a few to a few 10's of Hz) in the vertical direction (e.g., the Y-direction). The high-frequency scan in the horizontal direction may correspond to a line scan, and the low-frequency scan in the vertical direction may correspond to a frame rate. The high frequency may be at a resonant frequency of the flexure assembly 304. The low frequency scan may not be at the resonant frequency.

In some other embodiments, the two-dimensional scanning of the lens assembly 320 may be performed in a Lissajous pattern. A Lissajous scan pattern may be achieved by scanning the lens assembly in the horizontal and vertical directions with similar but not identical frequencies. Mathematically, a Lissajous curve is a graph of parametric equations:

$$x = A\sin(at+\delta),\ y = B\sin(bt),$$

where a and b are the frequencies in the x direction (e.g., the horizontal direction) and y direction (e.g., the vertical direction), respectively; t is time; and δ is a phase difference.

The frame rate may be related to the difference between the two frequencies a and b. In some embodiments, the scanning frequencies a and b may be chosen based on a desired frame rate. For instance, if a frame rate of 10 frames per second is desired, a frequency of 200 Hz in the horizontal direction and 210 Hz in the vertical direction may be chosen. In this example, the Lissajous pattern may repeat exactly from frame to frame. By choosing the two frequencies a and b to be significantly greater than the frame rate and properly selecting the phase difference 8, a relatively uniform and dense coverage of the field of view may be achieved.

In some other embodiments, if it is desired for the Lissajous pattern not to repeat, a different frequency ratio or an irrational frequency ratio may be chosen. For example, the scanning frequencies in the two directions a and b may be chosen to be 200 Hz and 210.1 Hz, respectively. In this example, if the frame rate is 10 frames per second, the Lissajous pattern may not repeat from frame to frame. As another example, the scanning frequencies a and b may be chosen to be 201 Hz and 211 Hz, respectively, so that the ratio a/b is irrational. In this example, the Lissajous pattern will also shift from frame to frame. In some cases, it may be desirable to have the Lissajous pattern not to repeat from frame to frame, as a trajectory of the laser source or the photodetector from a subsequent frame may fill in gaps of a trajectory from an earlier frame, thereby effectively have a denser coverage of the field of view.

In some embodiments, a frequency separation that is multiples of a desired frame rate may also be used. For example, the scanning frequencies in the two directions a and b may be chosen to be 200 Hz and 220 Hz, respectively. In this case, for example, a frame of either 10 Hz or 20 Hz may be used. According to various embodiments, a ratio between the scanning frequencies a and b may range from about 0.5 to about 2.0.

Referring to FIG. 3, in some embodiments, the rod springs 370*a*-370*d* may be made to have slightly different resonance frequencies in the horizontal direction and the vertical direction. In some embodiments, this may be achieved by making the rod springs 370*a*-370*d* stiffer in the horizontal direction (e.g., the X-direction) than in the vertical direction (e.g., the Y-direction), or vice versa. In some other embodiments, this may be achieved by making the rod springs 370*a*-370*d* having a rectangular or an oval cross-section over a portion or an entire length thereof. Using springs with an oval cross-section may reduce stresses at the corners as compared to springs with a rectangular cross-section. Alternatively, each rod spring 370*a*-370*d* may have a rectangular cross-section with rounded corners to reduce stress. In some embodiments, the scanning frequencies a and b may be advantageously chosen to correspond to the resonance frequencies of the rod springs 370*a*-370*d* in the horizontal direction and the vertical direction, respectively.

Figure 4B:
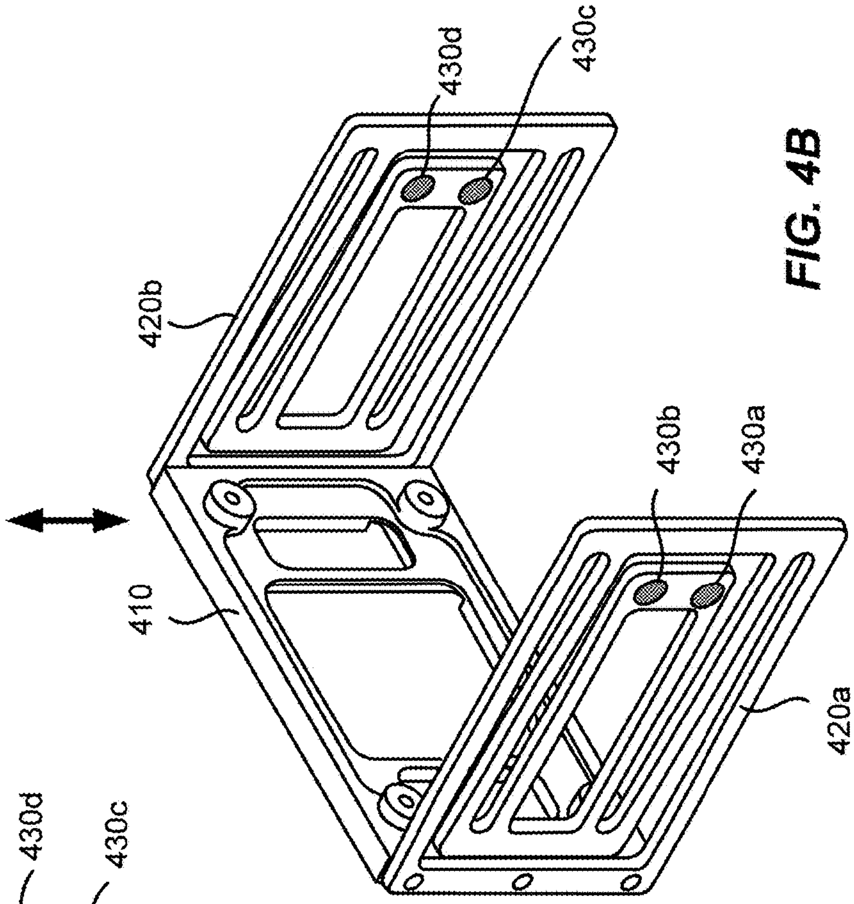
FIGS. 4A and 4B illustrate schematically a resonator structure for scanning a LiDAR system according to some other embodiments.
Figure 4A:
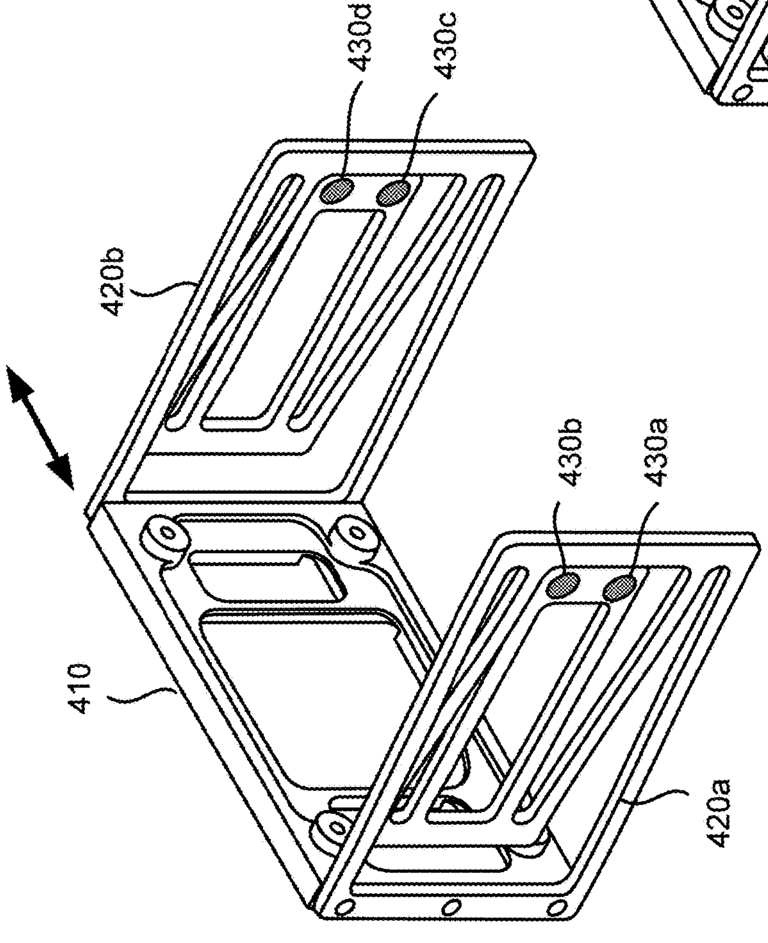

Other types of two-dimensional flexures different from the rod springs may also be used. FIGS. 4A and 4B illustrate schematically a resonator structure for scanning a LiDAR system according to some other embodiments. A frame 410 may be attached to a pair of flexures 420*a* and 420*b* on either side thereof. The frame 410 may carry a lens assembly, such as the lens assembly 320 of the LiDAR system 300 illustrated in FIG. 3.

Each of the pair of flexures 420*a* and 420*b* may be fabricated by cutting a plate of spring material. A convolution configuration, as illustrated in FIGS. 4A and 4B, may be used to increase the effective length of the spring member. One end of each of the pair of flexures 420*a* and 420*b* may be attached to fixed mounting points 430*a*-430*d*. The pair of flexures 420*a* and 420*b* may be flexed in both the horizontal direction and the vertical direction, so as to move the frame 410 horizontally and vertically, as indicated by the double-sided arrows in FIGS. 4A and 4B, respectively. To scan the lens assembly of a LiDAR system horizontally and vertically, the frame 410 may be vibrated at or near its resonance frequencies in both horizontal and vertical directions.

Figure 5:
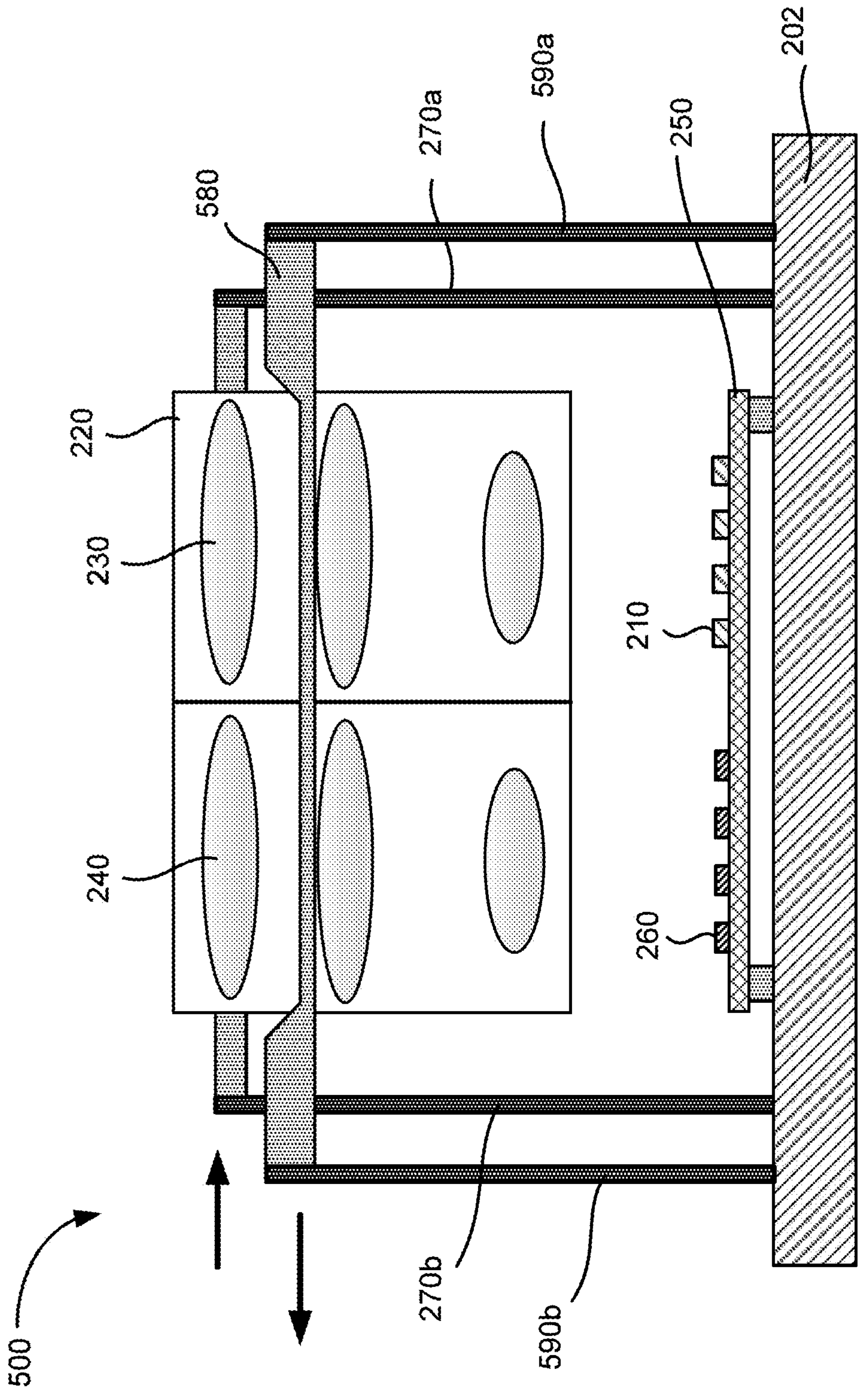
FIG. 5 illustrates schematically a scanning LiDAR system that includes a counter-balance structure according to some embodiments.

In order to mitigate any vibrations that may be caused by the scanning of the lens assembly, a counter-balance may be used in a LiDAR system. FIG. 5 illustrates schematically a scanning LiDAR system 500 that includes a counter-balance structure 580 according to some embodiments. The LiDAR system 500 is similar to the LiDAR system 200 illustrated in FIG. 2, but also includes a counter-balance object 580 flexibly attached to the base frame 202 via a pair of flexures 590*a* and 590*b*. The pair of flexures 590*a* and 590*b* may be coupled to an actuator (not shown), which may be controlled by a controller (not shown) to move the counter-balance object 580 in an opposite direction as the lens assembly 220, as illustrated by the opposite arrows in FIG. 5.

In some embodiments, the counter-balance structure 580 may be arranged to scan sympathetically to the lens assembly 220 without active drive, similar to the way one arm of a tuning fork will vibrate opposite to the other arm even if only the other arm is struck. In another embodiment, the counter-balance structure 580 may be driven and the lens assembly 220 may scan sympathetically. In yet another embodiment, a driving mechanism may be arranged to act between the lens assembly 220 and the counter-balance structure 580 without direct reference to the base frame 202.

In some embodiments, the counter-balance object 580 may advantageously be configured to have a center of mass that is close to the center of mass of the lens assembly 220. In some embodiments, the counter-balance object 580 may have substantially the same mass as the mass of the lens assembly 220. Thus, when the counter-balance object 580 is scanned with equal magnitude as the lens assembly 220 but in an opposite direction, the momentum of the counter-balance object 580 may substantially cancel the momentum of the lens assembly 220, thereby minimizing the vibration of the LiDAR system 500. In some other embodiments, the counter-balance object 580 may have a mass that is smaller (or larger) than the mass of the lens assembly 220, and may be scanned with a larger (or smaller) amplitude than the lens assembly 220, so that the momentum of the counter-balance object 580 substantially cancels the momentum of the lens assembly 220.

Figure 6:
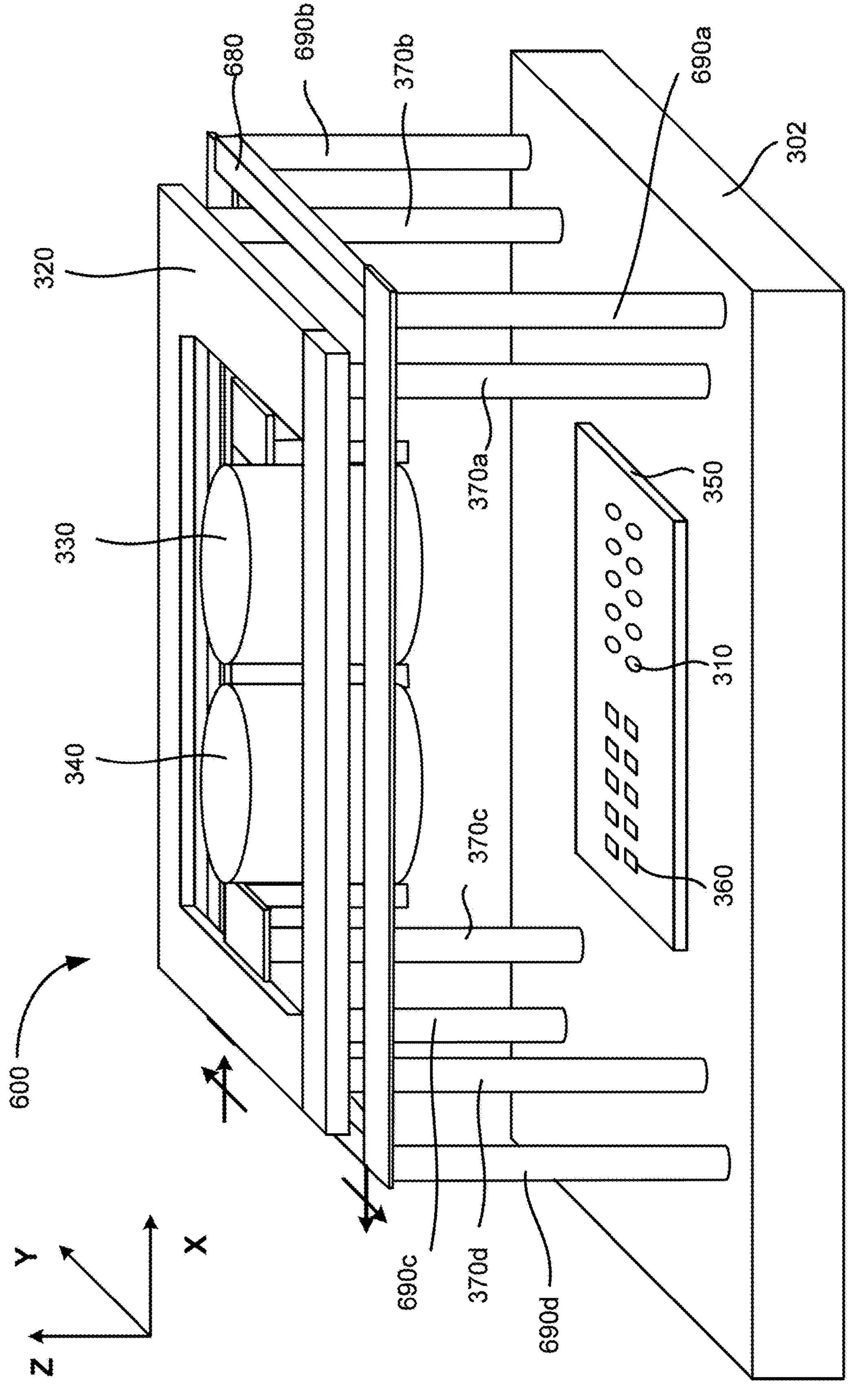
FIG. 6 illustrates schematically a scanning LiDAR system that includes a counter-balance structure that can be scanned in two dimensions according to some embodiments.

FIG. 6 illustrates schematically a scanning LiDAR system 600 that includes a counter-balance structure that can be scanned in two dimensions according to some embodiments. The LiDAR system 600 is similar to the LiDAR system 300 illustrated in FIG. 3, but also includes a counter-balance object 680 flexibly attached to the base frame 302 via four flexures 690*a*-690*d*. Each of the four flexures 690*a*-690*d* is attached to a respective corner of the counter-balance object 680. The four flexures 690*a*-690*d* may be coupled to actuators (not shown), which are controller by a controller to move the counter-balance object 680 in opposite directions, both horizontally (e.g., in the X-direction) and vertically (e.g., in the Y-direction). The mass of the counter-balance object 680 and its amplitude of motion may be configured so that the momentum of the counter-balance object 680 substantially cancels the momentum of the lens assembly, thereby minimizing the vibration of the LiDAR system 600.

Figure 7:
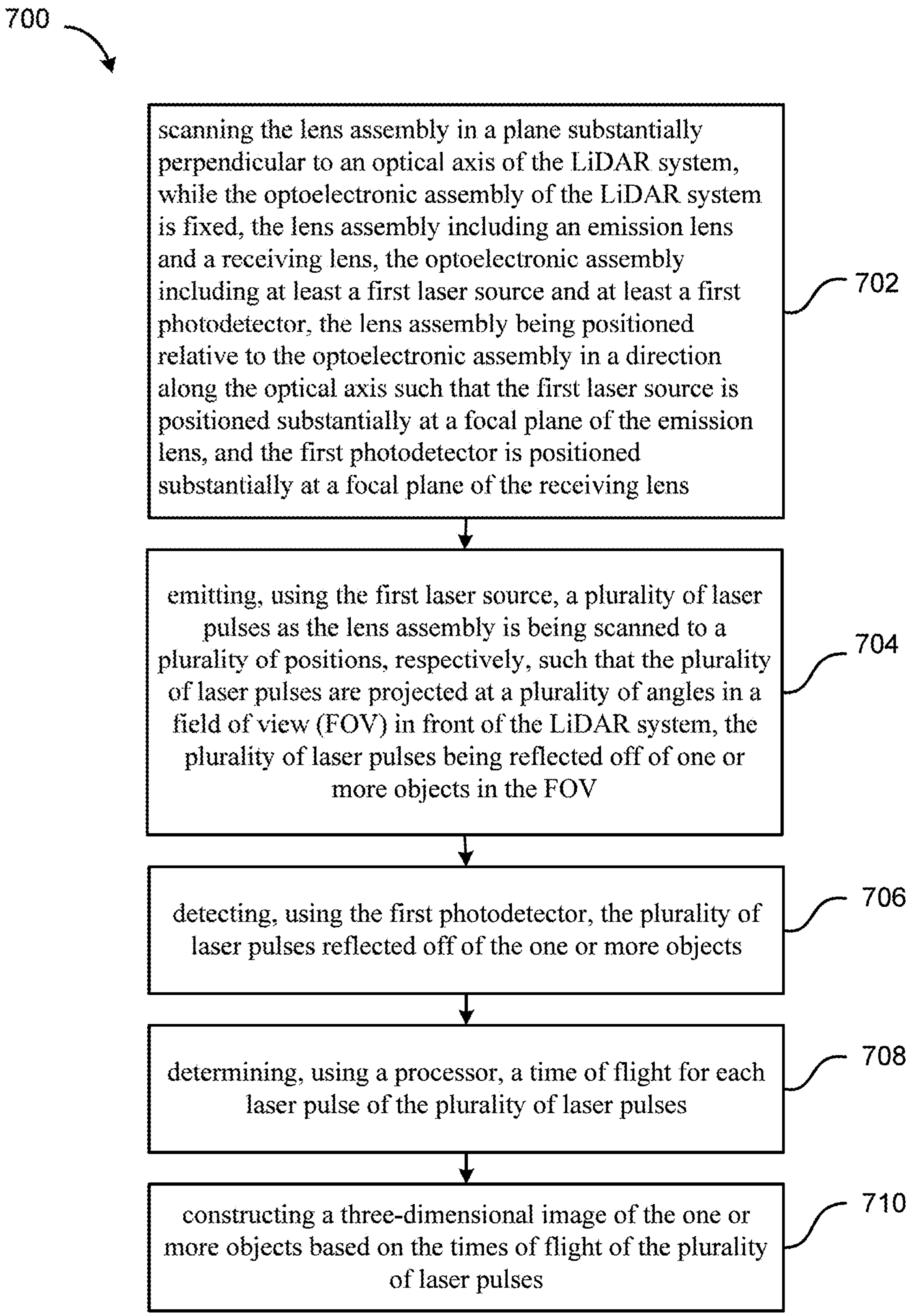
FIG. 7 is a simplified flowchart illustrating a method of three-dimensional imaging using a scanning LiDAR system according to some embodiments of the present invention.

FIG. 7 is a simplified flowchart illustrating a method 700 of three-dimensional imaging using a scanning LiDAR system according to some embodiments of the present invention. The scanning LiDAR system includes a lens assembly and an optoelectronic assembly.

The method 700 includes, at 702, scanning the lens assembly in a plane substantially perpendicular to an optical axis of the LiDAR system, while the optoelectronic assembly of the LiDAR system is fixed. The lens assembly may include an emission lens and a receiving lens. The optoelectronic assembly may include at least a first laser source and at least a first photodetector. The lens assembly is positioned relative to the optoelectronic assembly in a direction along the optical axis such that the first laser source is positioned substantially at a focal plane of the emission lens, and the first photodetector is positioned substantially at a focal plane of the receiving lens.

The method 700 further includes, at 704, emitting, using the first laser source, a plurality of laser pulses as the lens assembly is being scanned to a plurality of positions, respectively, such that the plurality of laser pulses are projected at a plurality of angles in a field of view (FOV) in front of the LiDAR system. The plurality of laser pulses may be reflected off of one or more objects in the FOV.

The method 700 further includes, at 706, detecting, using the first photodetector, the plurality of laser pulses reflected off of the one or more objects.

The method 700 further includes, at 708, determining, using a processor, a time of flight for each laser pulse of the plurality of laser pulses.

The method 700 further includes, at 710, constructing a three-dimensional image of the one or more objects based on the times of flight of the plurality of laser pulses.

It should be appreciated that the specific steps illustrated in FIG. 7 provide a particular method of three-dimensional imaging using a scanning LiDAR system according to some embodiments of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

II. Lidar Systems with Optical Fiber Array

According to some embodiments, a scanning LiDAR system may use optical fibers to couple light beams emitted by the laser sources to the focal plane of an emission lens, and to couple return laser beams focused at the focal plane of a receiving lens to the photodetectors. Instead of moving the lens assembly or the laser sources, the ends of the optical fibers are moved relative to the lens assembly so as to scan the laser beams across a FOV.

Figure 8:
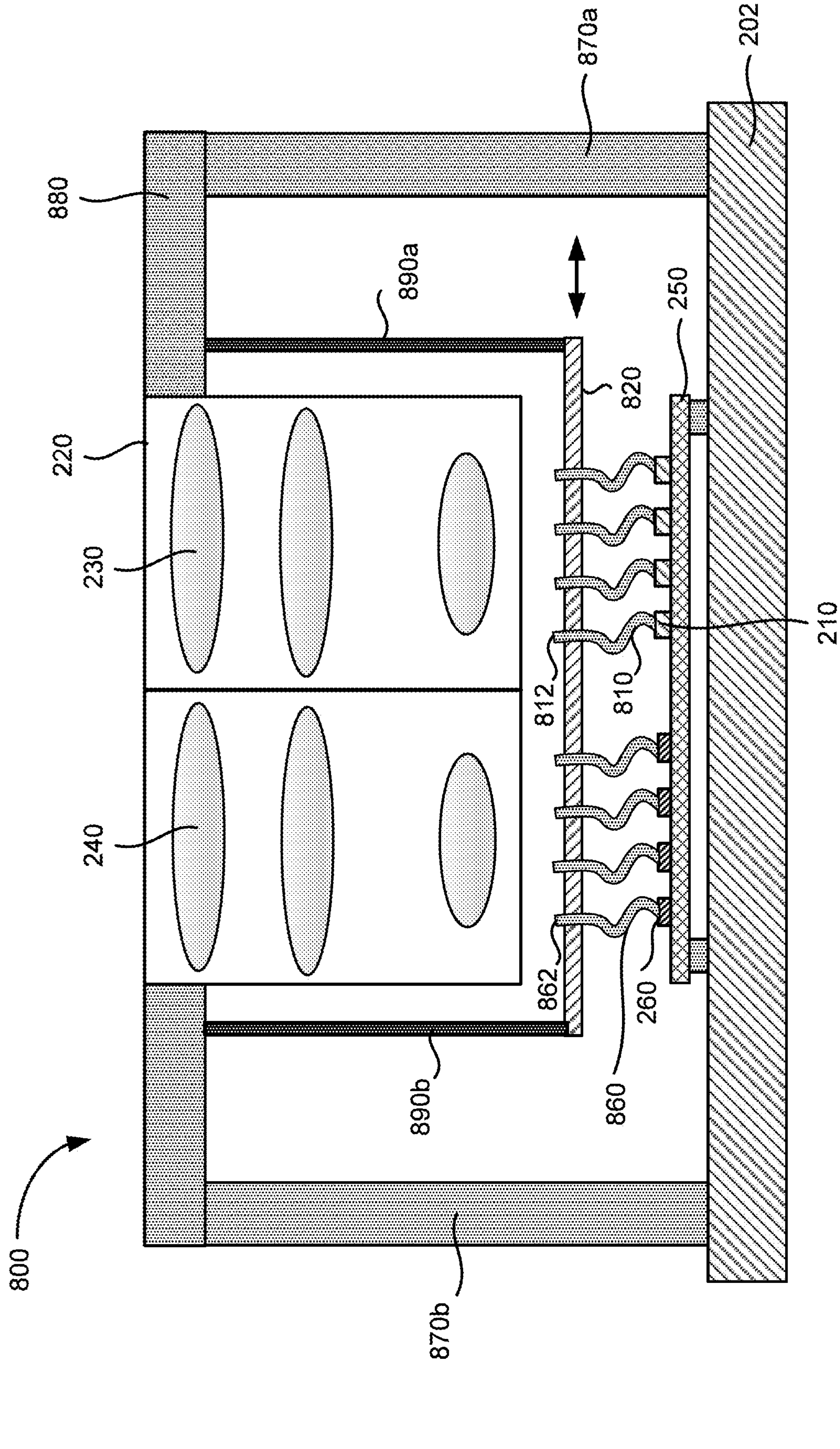
FIG. 8 illustrates schematically a scanning LiDAR system that includes an array of optical fibers according to some embodiments.

FIG. 8 illustrates schematically a scanning LiDAR system 800 that uses an array of optical fibers according to some embodiments. Similar to the LiDAR system 200 illustrated in FIG. 2, the LiDAR system 800 includes one or more laser sources 210 and one or more photodetectors 260, which are mounted on an optoelectronic board 250. The optoelectronic board 250 is fixedly attached to a base frame 202. The LiDAR system 800 also includes an emission lens 230 and a receiving lens 240, which are mounted in a lens mount 220. The lens mount 220 is fixedly attached to a lens frame 880, which is in turn fixedly attached to the base frame by supporting beams 870*a* and 870*b*.

The LiDAR system 800 also includes one or more emission optical fibers 810. A first end of each emission optical fiber 810 is coupled to a respective laser source 210 of the one or more laser sources 210. A second end 812 of each emission optical fiber 810 is positioned substantially at the focal plane of the emission lens 230. Thus, a light beam emitted by the respective laser source 210 is coupled into the respective emission optical fiber 810, and is emitted from the second end 812 of the emission optical fiber 810 to be collimated by the emission lens 230.

The LiDAR system 800 also includes one or more receiving optical fibers 860. A first end of each receiving optical fiber 860 is coupled to a respective photodetector 260 of the one or more photodetectors 260. A second end 862 of each receiving optical fiber 860 is positioned substantially at the focal plane of the receiving lens 240. The position of the second end 862 of the receiving optical fiber 860 is optically conjugate with the position of the second end 812 of the emission optical fiber 810, so that a return light beam focused by the receiving lens 240 may be coupled into the receiving optical fiber 860, and to be propagated onto the respective photodetector 260.

The second end 812 of each emission optical fiber 810 and the second end 862 of each receiving optical fiber 860 are attached to a platform 820. The platform 820 is flexibly attached to the lens frame 880 via a pair of flexures 890*a* and 890*b*. The platform 820 may be moved laterally left or right relative to the lens frame 880 by deflecting the pair of flexures 890*a* and 890*b* using an actuator (not shown), as indicated by the double-sided arrow in FIG. 8. Thus, the second end 812 of each emission optical fiber 810 may be scanned laterally in the focal plane of the emission lens 230, causing the laser beams emitted by the one or more laser sources 810 to be scanned across a FOV after being collimated by the emission lens 230. Although the platform 820 is illustrated as attached to the lens frame 880 via the flexures 890*a*-890*d*, the platform 820 may also be attached to the base frame 202 via a set of flexures in alternative embodiments.

In the LiDAR system 800, both the lens assembly 880 and the optoelectronic assembly 250 are fixed, and the scanning is achieved by moving the platform 820, thereby moving the second ends 812 of the emission optical fibers 810 and the second ends 862 of the receiving optical fibers 860 relative to the lens assembly 880. Since optical fibers with relatively small diameters can be quite flexible, moving the platform 820 may not cause significant strains on the emission optical fibers 810 and the receiving optical fibers 860. Thus, the LiDAR system 800 may be operationally robust.

In some embodiments in which the LiDAR system 800 includes multiple laser sources 210 and multiple photodetectors 260 (e.g., four laser sources 210 and four photodetectors 260 as illustrated in FIG. 8), the second ends 812 of the emission optical fibers 810 and the second ends 862 of the receiving optical fibers 860 may be positioned and oriented to take into account the field curvature and distortions of the emission lens 230 and the receiving lens 240. For example, assuming that the surface of best focus of the emission lens 230 is a curved surface due to field curvature, the second ends 812 of the emission optical fibers 810 may be positioned on the curved surface of best focus of the emission lens 230. Similarly, assuming that the surface of best focus of the receiving lens 240 is a curve surface, the second ends 862 of the receiving optical fibers 860 may be positioned on the curved surface of best focus of the receiving lens 240. Additionally or alternatively, to mitigate lens distortions, the second ends 812 of the emission optical fibers 810 may be oriented such that light beams emitted therefrom are directed toward the center of the emission lens 230. The second ends 862 of the receiving optical fibers 860 may be oriented similarly so as mitigate lens distortions.

Figure 9:
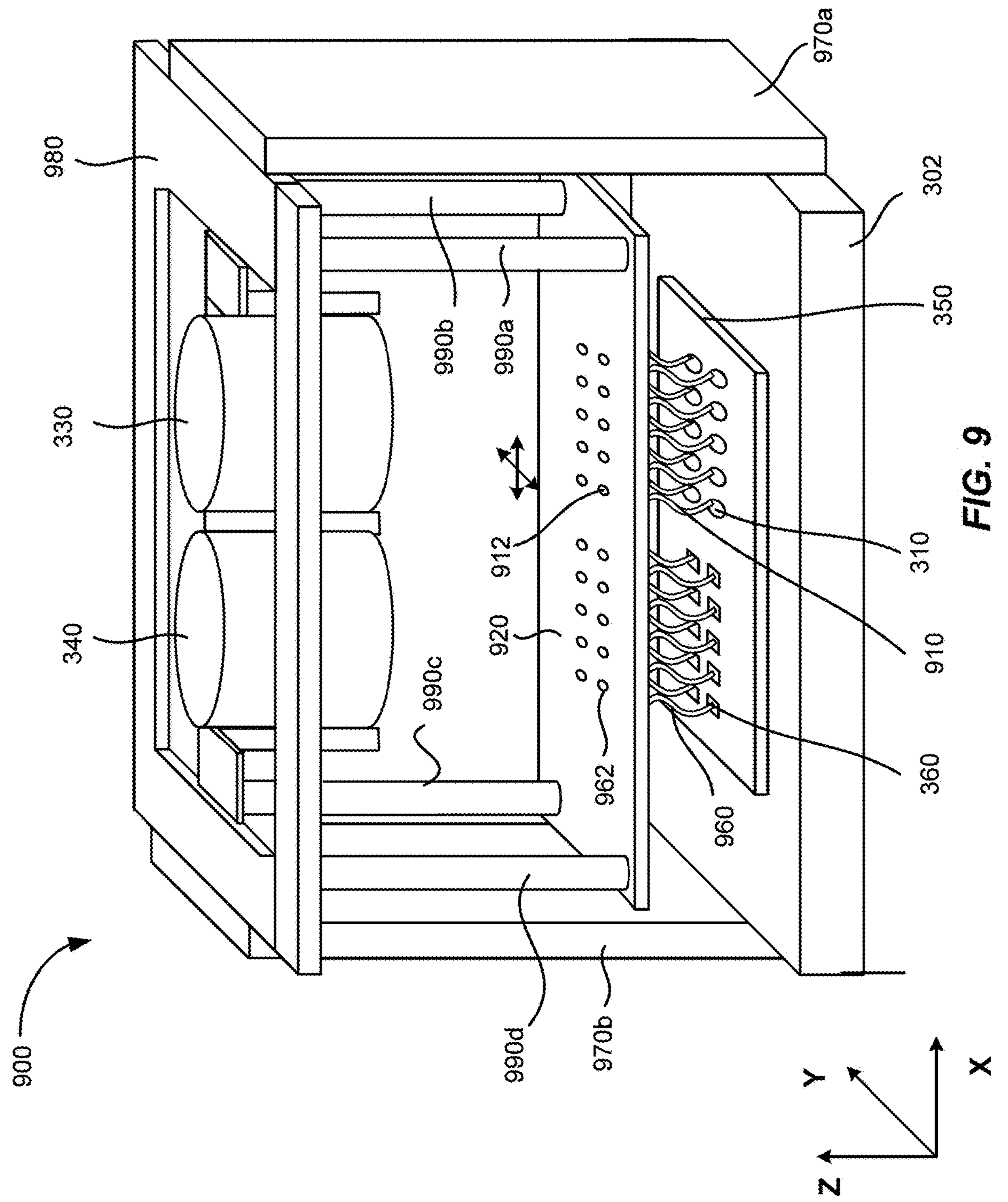
FIG. 9 illustrates schematically a scanning LiDAR system that includes an array of optical fibers that may be scanned in two dimensions according to some embodiments.

FIG. 9 illustrates schematically a scanning LiDAR system 900 that uses an array of optical fibers that may be scanned in two dimensions according to some embodiments. Similar to the LiDAR system 300 illustrated in FIG. 3, the LiDAR system 900 includes one or more laser sources 310 and one or more photodetectors 360 mounted on an optoelectronic board 350. The optoelectronic board 350 is fixedly attached to a base frame 302. The LiDAR system 900 also includes an emission lens 330 and a receiving lens 340 attached to a lens frame 980. The lens frame 980 is fixedly attached to the base frame 302 via two supporting beams 970*a* and 970*b*.

The LiDAR system 900 further includes one or more emission optical fibers 910, and one or more receiving optical fibers 960. A first end of each emission optical fiber 910 is coupled to a respective laser source 310 of the one or more laser sources 310. A second end 912 of each emission optical fiber 910 is attached to a platform 920. A first end of each receiving optical fiber 960 is coupled to a respective photodetector 360 of the one or more photodetectors 360. A second end 962 of each receiving optical fiber 960 is attached to the platform 920.

The platform 920 is spaced apart from the emission lens 330 and the receiving lens 340 such that the second ends 912 of the emission optical fibers are positioned substantially in the focal plane of the emission lens 330, and the second ends 962 of the receiving optical fibers are positioned substantially in the focal plane of the receiving lens 340. Thus, a light beam emitted by a respective laser source 310 may be coupled into a respective emission optical fiber 310, which may subsequently be emitted from the second end 912 of the emission optical fiber 910 to be collimated by the emission lens 330. A return light beam focused by the receiving lens 340 may be coupled into a respective receiving optical fiber 960 through its second end 962, and propagated by the respective receiving optical fiber 960 onto a respective photodetector 360.

The platform 920 is flexibly attached to the lens frame 980 via four flexures 990*a*-990*d*, which may be coupled to one or more actuators (not shown). The platform 920 may be moved laterally in two dimensions (e.g., in the X-direction and Y-direction) in a plane substantially perpendicular to the optical axis (e.g., in the Z-direction) of the emission lens 330 and the optical axis of the receiving lens 340 by deflecting the flexures 990*a*-990*d* via the actuators, as indicated by the two double-sided arrows in FIG. 9. As the second ends 912 of the emission optical fibers 910 are scanned in the focal plane of the emission lens 330, the laser beams emitted from the second ends 912 of the emission optical fibers 910 are scanned across a FOV after being collimated by the emission lens 330. In alternative embodiments, the platform 920 may be flexibly attached to the base frame 302 via a set of flexures.

Similar to the LiDAR system 700 illustrated in FIG. 7, in cases of multiple laser sources 310 and multiple photodetectors 360 (e.g., ten laser sources 310 arranged as a two-dimensional array, and ten photodetectors 360 arranged as a two-dimensional array, as illustrated in FIG. 9), the second ends 912 of the emission optical fibers 910 and the second ends 962 of the receiving optical fibers 960 may be positioned and oriented to take into account the field curvature and distortions of the emission lens 330 and the receiving lens 340.

In some embodiments, the two-dimensional scanning of the platform 920 may be performed in a raster scan pattern. For example, the platform 920 may be scanned at a higher frequency (e.g., on the order of a hundred to a few hundred Hz) in the horizontal direction (e.g., the X-direction), and at a lower frequency (e.g., on the order of a few to a few 10's of Hz) in the vertical direction (e.g., the Y-direction). The high-frequency scan in the horizontal direction may correspond to a line scan, and the low-frequency scan in the vertical direction may correspond to a frame rate. The high frequency may be at a resonant frequency of the flexure assembly. The low frequency scan may not be at the resonant frequency. In some other embodiments, the two-dimensional scanning of the platform 920 may be performed in a Lissajous pattern, by scanning in both directions at relatively high frequencies that are close but not identical, as discussed above with reference to FIG. 3.

Figure 10A:
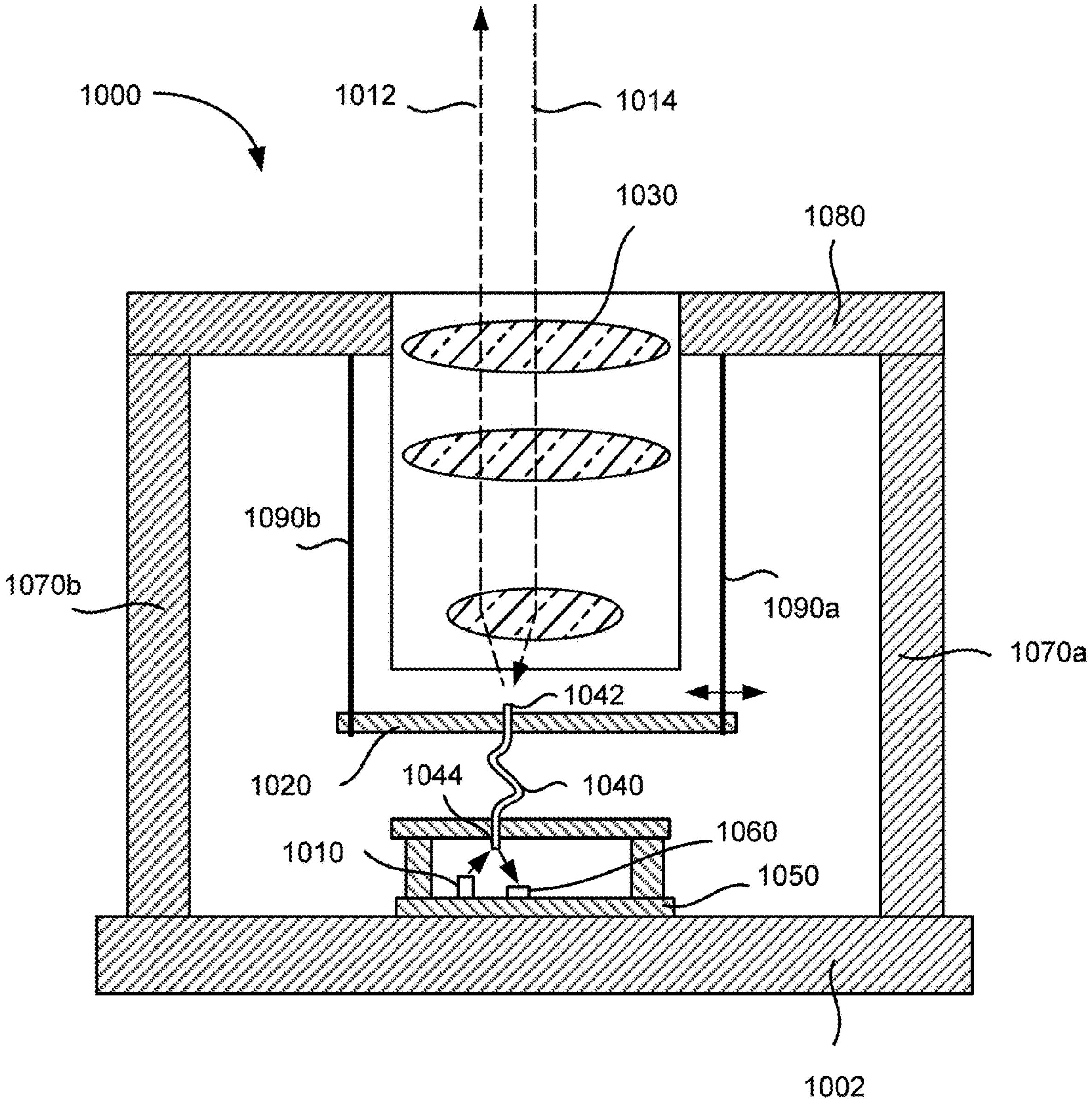
FIGS. 10A and 10B illustrate schematically scanning LiDAR systems that use scanning fiber(s) according to some embodiments.

In some embodiments, a single optical fiber can be used for both conducting light emitted by a laser source to the focal plane of a lens, and conducting light reflected off an object to a photodetector. FIG. 10A illustrates schematically a scanning LiDAR system 1000 that uses a single optical fiber for conducting both outgoing light and incoming light according to some embodiments. The LiDAR system 1000 includes a laser sources 1010 and a photodetector 1060, which are mounted on an optoelectronic board 1050. The optoelectronic board 1050 is fixedly attached to a base frame 1002. The LiDAR system 1000 also includes a lens 1030, which is fixedly attached to a lens frame 1080, which is in turn fixedly attached to the base frame 1002 by supporting beams 1070*a* and 1070*b*.

The LiDAR system 1000 also includes an optical fiber 1040. A first end 1042 of the optical fiber 1040 is attached to a platform 1020. The platform 1020 is flexibly attached to the lens frame 1080 via a pair of flexures 1090*a* and 1090*b*. The platform 1020 can be moved laterally left or right relative to the lens frame 1080 by flexing the pair of flexures 1090*a* and 1090*b* using an actuator (not shown). In some embodiments, the flexures 1090*a* and 1090*b* can be flexed in two dimensions (e.g., both in the left and right direction and in the direction in and out of the page). Alternatively, the platform 1020 can be flexibly attached to the base frame 1002 via flexures. The platform 1020 is spaced apart from the lens 1030 so that the first end 1042 of the optical fiber 1040 is positioned substantially at the focal plane of the lens 1030.

Light emitted by the laser source 1010 can be coupled into a second end 1044 of the optical fiber 1040, propagated to the first end 1042, and be emitted from the first end 1042. Thus, an outgoing light beam 1012 can be collimated by the lens 1030 and be projected to a scene. An incoming light beam 1014 that is reflected off an object in the scene can be focused by the lens 1030, and be coupled into the first end 1042 of the optical fiber 1040.

According to some embodiments, the incoming light and the outgoing light can be separated at the second end 1044 of the optical fiber 1040 using an optical beam splitter or other optical components. Exemplary optical components can include free-space beam splitters (e.g., prism beam splitter, or polarizing beam splitter), fiber-optic splitters (e.g., fused biconical taper (FBT) splitter, or planar lightwave circuit (PLC) splitter), waveguide coupler, partially transmitting and partially reflecting mirror, and the like.

According to some embodiments, other optical elements, such as a small lens, an optical filter, and/or an anti-reflective coating can be attached or applied to the first end 1042 of the optical fiber 1040 to improve light coupling between the optical fiber 1040 and the lens 1030. A similar optical component can also be attached or applied to the second end 1044 of the optical fiber 1040 to improve light coupling between the optical fiber 1040 and the laser source 1010 and the photodetector 1060.

Figure 10B:
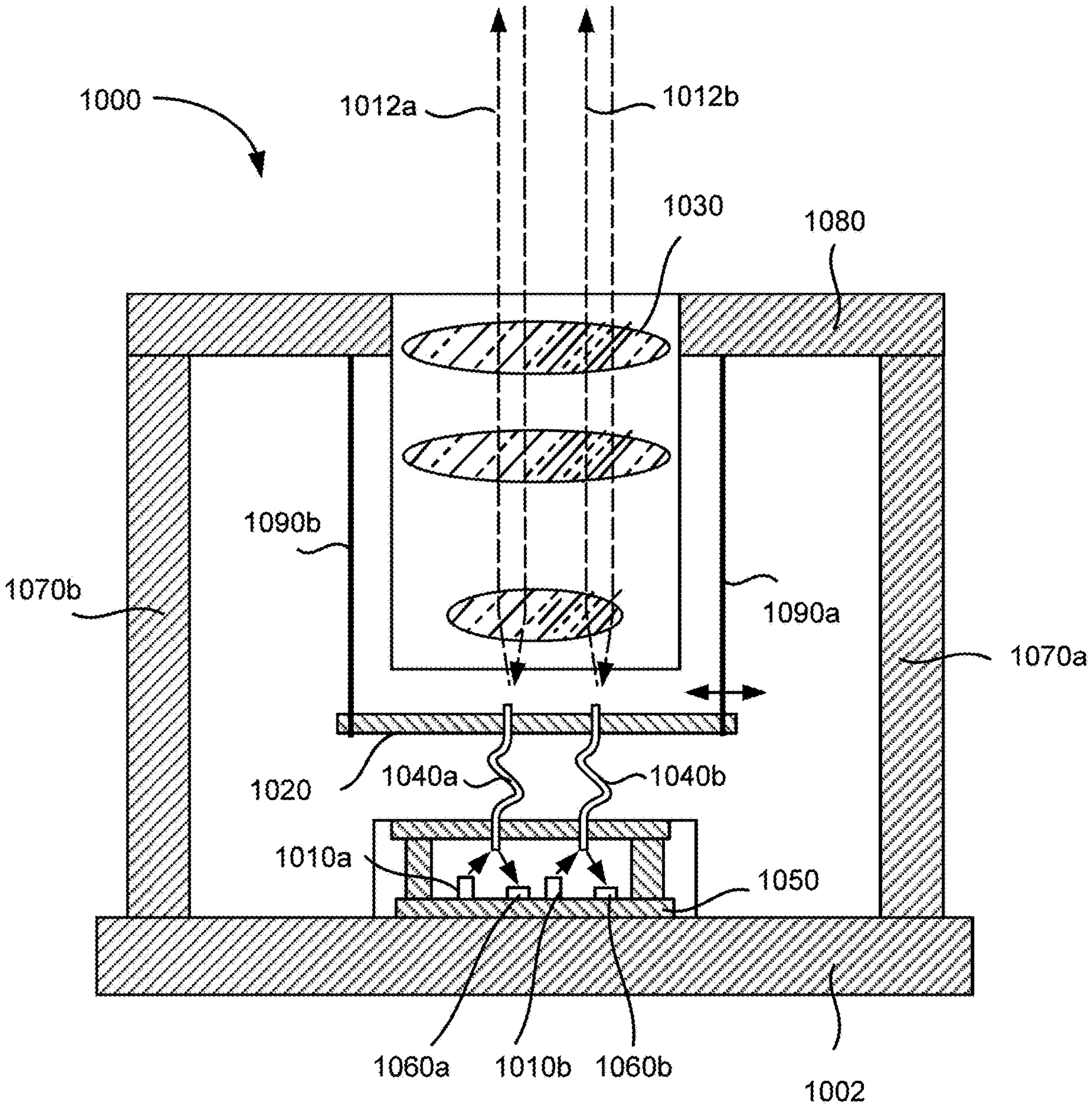

According to some embodiments, an array of laser sources and an array of photodetectors can be used for covering a larger field of view. As an example, FIG. 10B shows the LiDAR system 1000 that includes two laser sources 1010*a* and 1010*b*, and two photodetectors 1060*a* and 1060*b*. A first optical fiber 1040*a* is optically coupled with the first laser source 1010*a* and the first photodetector 1060*a*; and a second optical fiber 1040*b* is optically coupled with the second laser source 1010*b* and the second photodetector 1060*b*. The first end of each of the first optical fiber 1040*a* and the second optical fiber 1040*b* is attached to the platform 1020. Thus, as the platform 1020 is scanned in the focal plane of the lens 1030 by flexing the flexures 1090*a* and 1090*b*, the light beams 1012*a* and 1012*b* emitted by the first laser source 1010*a* and the second laser source 1010*b*, respectively, can cover a larger field of view.

Figure 11:
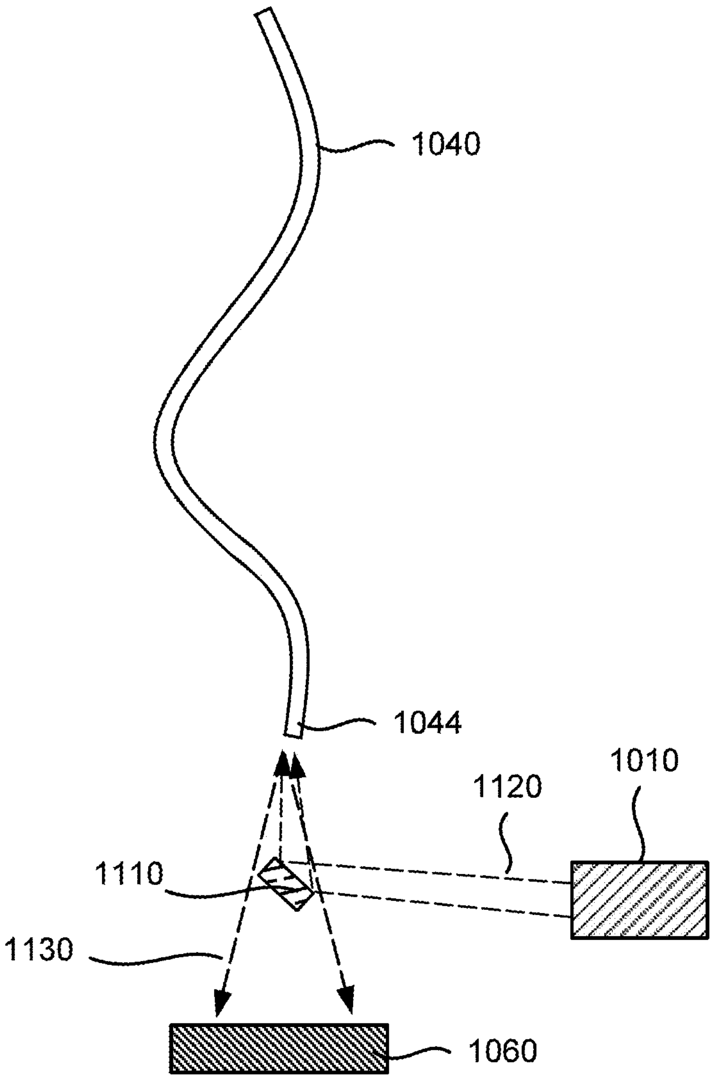
FIGS. 11 and 12 illustrate some exemplary configurations of using a mirror for coupling light between an optical fiber and a laser source or a photodetector according to some embodiments.
Figure 12:
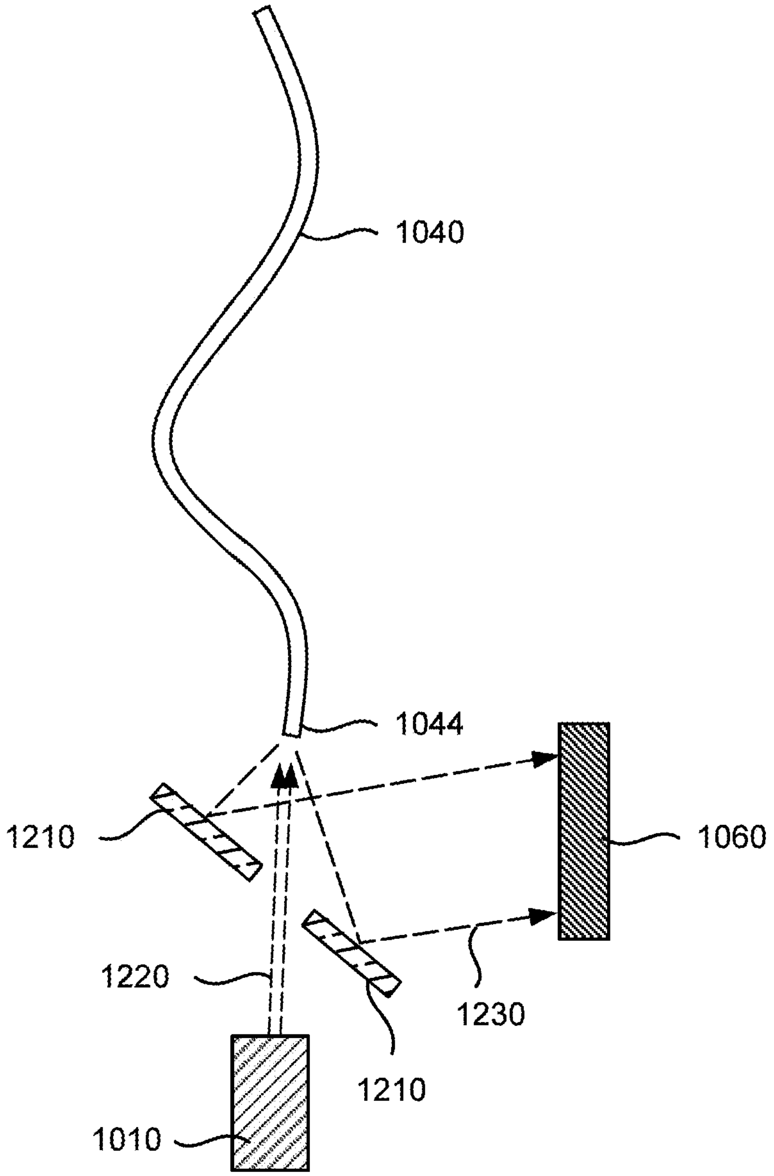

According to some embodiments, a mirror can be used to couple light emitted by the laser source 1010 into the optical fiber 1040, or to couple incoming light from the fiber 1040 onto the photodetector 1060. FIGS. 11 and 12 illustrate some examples. In FIG. 11, a mirror 1110 is positioned adjacent the second end 1044 of the optical fiber 1040. A light beam 1120 emitted by the laser source 1010 is reflected by the mirror 1110 toward the second end 1044 of the optical fiber 1040 to be coupled into the optical fiber 1040. The photodetector 1060 is positioned directly downstream from the second end 1044 of the optical fiber 1040. Since the light beam 1120 emitted by the laser source 1010 may be somewhat collimated (e.g., having a relatively small diverging angle), the size of the mirror 1110 can be rather small, so that only a small portion of the incoming light beam 1130 is blocked by the mirror 1110.

In FIG. 12, a mirror 1210 is positioned adjacent the second end 1044 of the optical fiber 1040. An incoming light beam 1230 is reflected by the mirror 1210 toward the photodetector 1060. The mirror 1210 has a hole, so that a light beam 1210 emitted by the laser source 1010 can pass through and be coupled into the optical fiber 1040 through the second end 1044. Again, because the light beam 1210 emitted by the laser source 1010 may be somewhat collimated, the hole can be made rather small, so that only a small portion of the incoming light beam 1230 is not reflected by the mirror 1210.

Figure 13:
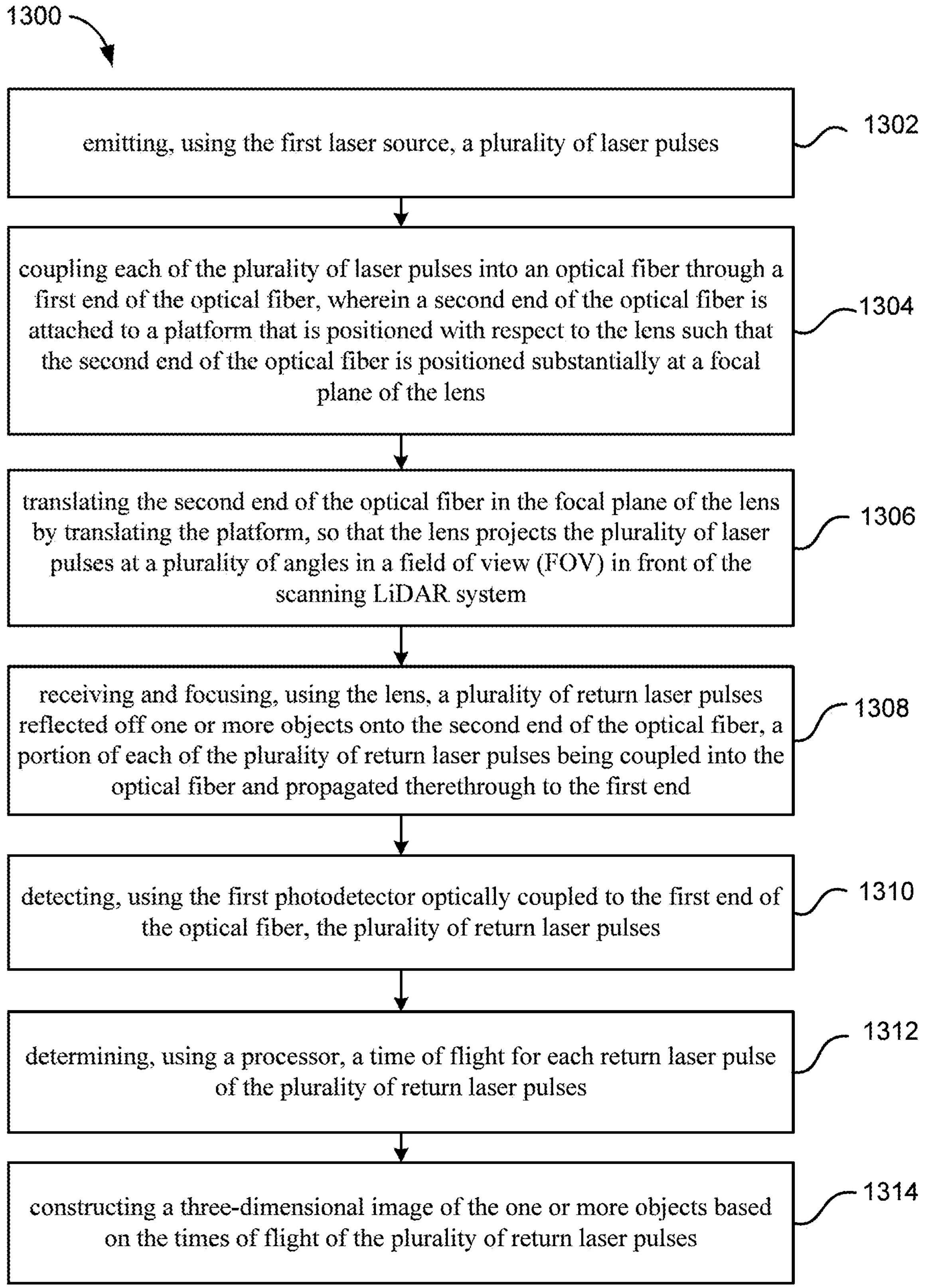
FIG. 13 is a simplified flowchart illustrating a method of three-dimensional imaging using a scanning LiDAR system according to some embodiments of the present invention.

FIG. 13 is a simplified flowchart illustrating a method 1300 of three-dimensional imaging using a scanning LiDAR system according to some embodiments of the present invention. The scanning LiDAR system includes an optoelectronic assembly and a lens. The optoelectronic assembly includes at least a first laser source and a first photodetector.

The method 1300 includes, at 1302, emitting, using the first laser source, a plurality of laser pulses; and at 1304, coupling each of the plurality of laser pulses into an optical fiber through a first end of the optical fiber. A second end of the optical fiber is attached to a platform that is positioned with respect to the lens such that the second end of the optical fiber is positioned substantially at a focal plane of the lens.

The method 1300 further includes, at 1306, translating the second end of the optical fiber in the focal plane of the lens by translating the platform, so that the lens projects the plurality of laser pulses at a plurality of angles in a field of view (FOV) in front of the scanning LiDAR system.

The method 1300 further includes, at 1308, receiving and focusing, using the lens, a plurality of return laser pulses reflected off one or more objects onto the second end of the optical fiber. A portion of each of the plurality of return laser pulses is coupled into the optical fiber through the second end and propagated therethrough to the first end.

The method 1300 further includes, at 1310, detecting, using the first photodetector optically coupled to the first end of the optical fiber, the plurality of return laser pulses; at 1312, determining, using a processor, a time of flight for each return laser pulse of the plurality of return laser pulses; and at 1314, constructing a three-dimensional image of the one or more objects based on the times of flight of the plurality of return laser pulses.

It should be appreciated that the specific steps illustrated in FIG. 13 provide a particular method of three-dimensional imaging using a scanning LiDAR system according to some embodiments of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A scanning LiDAR system comprising:

a base frame;

a lens frame fixedly attached to the base frame;

a lens attached to the lens frame, the lens having a focal plane;

an optoelectronic assembly fixedly attached to the base frame, the optoelectronic assembly including one or more laser sources and one or more photodetectors;

a platform;

one or more optical fibers, each respective optical fiber having a first end attached to the platform, and a second end optically coupled to a respective laser source and a respective photodetector, wherein the platform is positioned with respect to the lens such that the first end of each respective optical fiber is positioned substantially at the focal plane of the lens, and wherein each respective optical fiber is configured to:

receive and propagate a light beam emitted by the respective laser source from the second end to the first end; and receive and propagate a return light beam from the first end to second end, so as to be received by the respective photodetector;

a flexure assembly flexibly coupling the platform to the lens frame or the base frame; and a driving mechanism coupled to the flexure assembly and configured to cause the flexure assembly to be flexed so as to scan the platform laterally in a plane substantially perpendicular to an optical axis of the scanning LiDAR system, thereby scanning the first end of each optical fiber in the plane relative to the lens.

2. The scanning LiDAR system of claim 1 wherein the second end of each respective optical fiber is optically coupled to the respective laser source and the respective photodetector via an optical beam splitter.

3. The scanning LiDAR system of claim 2 wherein the optical beam splitter comprises a prism beam splitter or a polarizing beam splitter.

4. The scanning LiDAR system of claim 1 wherein the second end of each respective optical fiber is optically coupled to the respective laser source and the respective photodetector via a fiber-optic splitter or a waveguide coupler.

5. The scanning LiDAR system of claim 1 further comprising a mirror configured to reflect the light beam emitted by the respective laser source toward the second end of the respective optical fiber.

6. The scanning LiDAR system of claim 1 further comprising a mirror configured to reflect the return light beam transmitted through the second end of the respective optical fiber toward the respective photodetector, wherein the mirror defines a hole configured to transmit the light beam emitted by the respective laser source to be coupled into the respective optical fiber through the second end of the respective optical fiber.

7. The scanning LiDAR system of claim 1 wherein the flexure assembly is configured to be flexible in two dimensions in the plane.

8. The scanning LiDAR system of claim 7 further comprising:

a controller coupled to the driving mechanism, the controller configured to drive the driving mechanism so as to cause the platform, via the flexure assembly, to be scanned in a first dimension with a first frequency, and in a second dimension orthogonal to the first dimension with a second frequency different from the first frequency.

9. The scanning LiDAR system of claim 8 wherein the second frequency differs from the first frequency such that a trajectory of the second end of each optical fiber follows a Lissajous pattern.

10. The scanning LiDAR system of claim 8 wherein the flexure assembly comprises a set of springs, each respective spring of the set of springs configured to have a first resonance frequency in the first dimension, and a second resonance frequency in the second dimension, the second resonance frequency being different from the first resonance frequency.

11. The scanning LiDAR system of claim 10 wherein the first frequency is substantially equal to the first resonance frequency, and the second frequency is substantially equal to the second resonance frequency.

12. The scanning LiDAR system of claim 1 wherein the one or more laser sources comprise a plurality of laser sources arranged as an array of laser sources, the one or more photodetectors comprise a plurality of photodetectors arranged as an array of photodetectors, and the one or more optical fibers comprise a plurality of optical fibers.

13. A method of three-dimensional imaging using a scanning LiDAR system, the scanning LiDAR system comprising an optoelectronic assembly and a lens, the optoelectronic assembly comprising at least a first laser source and a first photodetector, the method comprising:

emitting, using the first laser source, a plurality of laser pulses;

coupling each of the plurality of laser pulses into an optical fiber through a first end of the optical fiber, wherein a second end of the optical fiber is attached to a platform that is positioned with respect to the lens such that the second end of the optical fiber is positioned substantially at a focal plane of the lens;

translating the second end of the optical fiber in the focal plane of the lens by translating the platform, so that the lens projects the plurality of laser pulses at a plurality of angles in a field of view (FOV) in front of the scanning LiDAR system;

receiving and focusing, using the lens, a plurality of return laser pulses reflected off one or more objects onto the second end of the optical fiber, a portion of each of the plurality of return laser pulses being coupled into the optical fiber through the first end and propagated therethrough to the first end;

detecting, using the first photodetector optically coupled to the first end of the optical fiber, the plurality of return laser pulses;

determining, using a processor, a time of flight for each return laser pulse of the plurality of return laser pulses; and constructing a three-dimensional image of the one or more objects based on the times of flight of the plurality of return laser pulses.

14. The method of claim 13 further comprising coupling, using a beam splitter, the plurality of return laser pulses, from the second end of the optical fiber to the first photodetector.

15. The method of claim 13 further comprising coupling, using a fiber-optic splitter or a waveguide coupler, the plurality of return laser pulses, from the second end of the optical fiber to the first photodetector.

16. The method of claim 13 wherein translating the second end of the optical fiber comprises translating the second end of the optical fiber in two dimensions in the focal plane of the lens.

17. The method of claim 16 wherein translating the second end of the optical fiber in the focal plane of the lens comprises translating the second end of the optical fiber in a first direction in the focal plane with a first frequency, and in a second direction orthogonal to the first direction with a second frequency different from the first frequency.

18. The method of claim 17 wherein the second frequency differs from the first frequency such that a trajectory of the second end of the optical fiber follows a Lissajous pattern.

* * * * *